(12) United States Patent
Malkamäki et al.

(10) Patent No.: US 9,788,284 B2
(45) Date of Patent: Oct. 10, 2017

(54) METHOD AND APPARATUS FOR TRIGGERING A POWER HEADROOM REPORT

(71) Applicant: Nokia Technologies Oy, Espoo (FI)

(72) Inventors: Esa Malkamäki, Espoo (FI); Petteri Lunden, Espoo (FI); Elena Virtej, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/123,778

(22) PCT Filed: Mar. 19, 2015

(86) PCT No.: PCT/FI2015/050186
§ 371 (c)(1),
(2) Date: Sep. 6, 2016

(87) PCT Pub. No.: WO2015/140408
PCT Pub. Date: Sep. 24, 2015

(65) Prior Publication Data
US 2017/0019866 A1 Jan. 19, 2017

Related U.S. Application Data

(60) Provisional application No. 61/968,938, filed on Mar. 21, 2014.

(51) Int. Cl.
*H04W 36/00* (2009.01)
*H04W 52/36* (2009.01)
(Continued)

(52) U.S. Cl.
CPC ......... *H04W 52/365* (2013.01); *H04W 24/10* (2013.01); *H04W 52/242* (2013.01); *H04W 72/04* (2013.01)

(58) Field of Classification Search
CPC ............. H04W 52/245; H04W 52/283; H04W 52/241; H04W 52/383; H04W 72/04;
(Continued)

(56) References Cited

U.S. PATENT DOCUMENTS

2010/0158147 A1 6/2010 Zhang et al.
2011/0243016 A1 10/2011 Zhang et al.
(Continued)

FOREIGN PATENT DOCUMENTS

WO 2011150361 12/2011

OTHER PUBLICATIONS

International Search Report and Written Opinion received for corresponding Patent Cooperation Treaty Application No. PCT/FI2015/050186, dated May 26, 2015, 10 pages.
(Continued)

*Primary Examiner* — Tu X Nguyen
(74) *Attorney, Agent, or Firm* — Harrington & Smith

(57) ABSTRACT

Various methods are provided for triggering a power headroom report. One example method may include storing a first pathloss value and a second pathloss value for a first entity and a first pathloss value and a second pathloss value for a second entity, for each of the first entity and second entity, determining whether first pathloss value or second pathloss value has changed more than a corresponding threshold value, determining whether the UE has UL resources for a new transmission, and in an instance where, for at least one of the first entity or second entity, the first pathloss value or second pathloss value has changed (e.g., increased or decreased) more than the corresponding threshold value, triggering a PHR. A corresponding apparatus and computer program product are also provided.

17 Claims, 5 Drawing Sheets

(51) Int. Cl.
*H04W 24/10* (2009.01)
*H04W 52/24* (2009.01)
*H04W 72/04* (2009.01)

(58) Field of Classification Search
CPC ......... H04W 72/0406; H04W 72/0413; H04W 72/042; H04W 36/32; H04W 48/16; H04W 36/30; H04W 52/244; H04W 52/365; H04W 36/0061
USPC ............ 455/443, 504, 506, 67.11, 69, 115.3, 455/226.1
See application file for complete search history.

(56) References Cited

U.S. PATENT DOCUMENTS

2014/0177584 A1* 6/2014 Ouchi ................. H04W 52/146
 370/329
2016/0198421 A1* 7/2016 Yi ....................... H04W 52/365
 370/329

OTHER PUBLICATIONS

3GPP R2-140139, PHR for dual connectivity, NSN, Nokia Corporation, Prague, Czech Republic, Feb. 10-14, 2014. Feb. 9, 2014.
3GPP R2-141199, Discussion on PHR triggering for Dual Connectivity, KDDI Corporation, Valencia, Spain, Mar. 31-Apr. 4, 2014.
Intel Corporation: *PHR for Dual Connectivity*, 3GPP Draft; R2-140283, $3^{rd}$ Generation Partnership Project (3GPP), Mobile Competence Centre; 650, Route Des Lucioles; F-06921 Sophia-Antipolis Cedex; France, vol. Ran WG2, No. Prague, Czech Republic; Feb. 10, 2014-Feb. 14, 2014, Feb. 9, 2014 (Feb. 9, 2014) XP050791678, URL: http://www.3gpp.org/ftp/Meetings_3GPP_ [retrieved on Feb. 9, 2014] section 1, 2; p. 1-p. 2.

* cited by examiner

METHOD AND APPARATUS FOR TRIGGERING A POWER HEADROOM REPORT

RELATED APPLICATION

This application was originally filed as PCT Application No. PCT/FI2015/050186 filed Mar. 19, 2015, which claims priority benefit from U.S. Provisional Application No. 61/968,938, filed Mar. 21, 2014.

TECHNOLOGICAL FIELD

Embodiments of the present invention relate generally to a method, apparatus, and computer program product for triggering a power headroom report (PHR).

BACKGROUND

Long term evolution ("LTE") of the Third Generation Partnership Project ("3GPP"), also referred to as 3GPP LTE, refers to research and development as part of an ongoing effort across the industry aimed at identifying technologies and capabilities that can improve systems such as the universal mobile telecommunication system ("UMTS"). The goals of this broadly based project include improving communication efficiency, lowering costs, improving services, making use of new spectrum opportunities, and achieving better integration with other open standards.

The evolved universal terrestrial radio access network ("E-UTRAN") in 3GPP includes base stations providing user plane (including packet data convergence protocol/radio link control/medium access control/physical layers) and control plane (including radio resource control/packet data convergence protocol/radio link control/medium access control/physical layers) protocol terminations towards wireless communication devices such as cellular telephones. A wireless communication device or terminal is generally known as user equipment ("UE"). A base station ("BS") is an entity or network element of a communication system or network often referred to as a Node B or an NB. Particularly in the E-UTRAN, an "evolved" base station is referred to as an eNodeB or an "eNB".

A current topic under discussion in the wireless industry relates to enhanced support of small cell deployment and operation, which may include, for example, the identification and evaluation of the benefits of UEs having dual connectivity to, for example, macro and small cell layers served by different carriers or, in some instances, the same carrier, and furthermore, for which scenarios dual connectivity may be feasible and/or beneficial. Additionally, another topic may include the identification and evaluation of potential architecture and protocol enhancements for scenarios involving UEs configured for dual connectivity in order to minimize core network impacts.

For example, in a recent agreement, two main user plane (UP) architectures considered as way forward in case of dual connectivity, (e.g., a first architecture not having a split bearer, such as "1A" and a second architecture having a split bearer, such as "3C", each of which will be discussed later). Different architecture alternatives may be also different configuration options and they may be used simultaneously (for different bearers). However, unresolved problems may include, for example, with dual connectivity, a UE may be connected to two eNBs simultaneously (e.g., a master eNB (MeNB) and a secondary eNB (SeNB), each of which will be described later). Having a UE connected to two eNBs simultaneously may result in a situation where it is unclear, in some cases, as to which eNB the UE should transmit PHR report. In some embodiments, how the network (NW) handles uplink (UL) scheduling of the UE may also be unresolved. This invention could apply to other UP architectures for dual connectivity as well, both for bearer split and no bearer split.

TS36.321 of the 3GPP specification specifies PHR procedure, but such procedure may not be at least in some parts applicable to dual connectivity cases, such as where UEs may be connected to two eNBs simultaneously.

In regards to a PHR for dual connectivity, it has been suggested that the PHR related timers and parameters may be independently configured for each medium access control (MAC) entity, the PHR may include power headroom (PH) information of all activated cells for a user equipment (UE), and in dual connectivity, if a PHR triggering event occurs in a MAC entity, the PHR may be triggered only in the corresponding MAC entity. Furthermore, when a PHR triggering event occurs, it has been suggested that the UE triggers one PHR in corresponding MAC entity, or when a PHR triggering event occurs, the UE triggers the PHR in both MAC entities.

As such, a power headroom report (PHR) would be triggered when one of the following events occur: (a) pathloss difference according to a threshold, namely, dl-PathlossChange which sets the change in measured downlink pathloss and the required power back-off due to power management, or (b) expiration of a periodic timer, namely, periodicPHR-Timer. However, these two triggering events may be different in nature. The change of DL pathloss may indicate a channel condition change which may be likely to affect also uplink (UL) power headroom, whereas a periodic report may be sent without any change in power headroom.

In the context of dual connectivity, each Master Cell Group (MCG) and Secondary Cell Group (SCG) may have their own timers and pathloss thresholds that may trigger the PHR. As such, for each MAC entity, a PHR may be triggered, provided the dl-PathlossChange or periodicPHR-Timer occur.

It has also been suggested that (1) a pathloss change of more than dl-PathlossChange dB for at least one activated Serving Cell of an eNB may trigger a PHR to both eNBs; and (2) ProhibitPHR-Timer and PeriodicPHR-Timer may be configured and maintained independently for each of two MAC entities, ensuring both E-UTRAN Node B (eNB) may receive a PHR report.

However, the PHR may not necessarily be sent when it is triggered. Instead there may be some delay, due to, for example, the PHR not triggering Scheduling Request (SR). The PHR instead may be sent when UE otherwise obtains UL allocation next time (e.g. when there is a measurement report or user data to be transmitted). Therefore, using a single reference may be problematic because the reference may be out of date for one of the MACs leading to a PHR not being triggered even though there has been substantial change in pathloss.

BRIEF SUMMARY

A method, apparatus and computer program product are therefore provided according to an example embodiment of the present invention for the triggering of a power headroom report. For example, since the PHR may be sent to different eNBs at different times, the UE may store separate pathloss reference values (for example, for serving cells in MCG and SCG) for a Master eNB (MeNB) MAC entity and a Secondary eNB (SeNB) MAC entity separately. The separate pathloss references may be stored for each MAC entity when PHR is reported to the corresponding eNB. Each MAC (in UE) entity may then use the corresponding pathloss reference values when evaluating the triggering of a subsequent PHR. As such, an example method may allow for each of the MCG and SCG to use the pathloss difference that is appropriate, the cost being a small increase in UE complexity due to storing a separate pathloss reference values for the MeNB MAC entity and the SeNB MAC entity.

In accordance with one embodiment of the present invention, a method may be provided comprising storing a first pathloss value and a second pathloss value for a first entity and a first pathloss value and a second pathloss value for a second entity, for each of the first entity and second entity, determining whether first pathloss value or second pathloss value has changed more than a corresponding threshold value, determining whether the UE has UL resources for a new transmission, and in an instance where, for at least one of the first entity or second entity, the first pathloss value or second pathloss value has changed (e.g., increased or decreased) more than the corresponding threshold value, triggering a PHR. In another embodiment, the method may include determining whether the UE has UL resources for a new transmission, and, in an instance in which the UE has UL resources for a new transmission and, for at least one of the first entity or the second entity, the first pathloss value or second pathloss value has changed more than the corresponding threshold, triggering a PHR. In another embodiment, the method may include determining whether the prohibitPHR-Timer expires or has expired before triggering a PHR. This may limit the number of PHR that UE can send even though the triggering conditions would otherwise be fulfilled. In some embodiments, the UE may send one or more values (e.g., pathloss reference values) in an instance in which there is more than one cell with MCG, SCG or both.

In accordance with one exemplary embodiment of the present invention, a method may be provided comprising storing a MCG pathloss value(s) (one for each serving cell in MCG) and a SCG pathloss value(s) (one for each serving cell in SCG) for a MeNB MAC entity and a MCG pathloss value(s) and a SCG pathloss value(s) for a SeNB MAC entity. The method may further comprise, for each of the MeNB MAC entity and SeNB MAC entity, determining whether MCG pathloss value or SCG pathloss value has changed more than a corresponding threshold value (e.g., dl-PathlossChange), determining whether the UE has UL resources for a new transmission, and in an instance where, for at least one of the MeNB MAC entity or SeNB MAC entity, the MCG pathloss value or SCG pathloss value has changed (e.g., increased or decreased) more than the corresponding threshold value, triggering a PHR. In another embodiment, the method may include determining whether the UE has UL resources for a new transmission. The method may further include, in an instance where, when the UE has UL resources for a new transmission and, for at least one of the MeNB MAC entity or SeNB MAC entity, the MCG pathloss value or SCG pathloss value has changed more than the corresponding threshold, triggering a PHR. In some example embodiments, the PHR may be triggered by the MAC entity (or both MAC entities) for which a pathloss has changed more than the corresponding pathloss threshold compared to the stored pathloss value of that MAC entity. In some example embodiments, a PHR triggered by a SeNB MAC entity will cause triggering PHR in the MeNB MAC entity (when there are UL resources allocated for transmission) or vice versa.

In accordance with one embodiment of the present invention, an apparatus may be provided. The apparatus may comprise at least one processor and at least one memory including computer program code, the at least one memory and the computer program code configured to, with the processor, cause the apparatus to at least store a first pathloss value and a second pathloss value for a first entity and a first pathloss value and a second pathloss value for a second entity, for each of the first entity and second entity, determine whether first pathloss value or second pathloss value has changed more than a corresponding threshold value, determine whether UE has UL resources for a new transmission, and in an instance where, for at least one of the first entity or second entity, the first pathloss value or second pathloss value has changed (e.g., increased or decreased) more than the corresponding threshold value, trigger a PHR. In another embodiment, the at least one memory and the computer program code may be configured to, with the processor, cause the apparatus to determine whether UE has UL resources for a new transmission, and, in an instance in which the UE has UL resources for a new transmission and, for at least one of the first entity or the second entity, the first pathloss value or second pathloss value has changed more than the corresponding threshold, trigger a PHR. In some embodiments, the UE may send one or more values (e.g., pathloss reference values) in an instance in which there is more than one cell with MCG, SCG or both.

In accordance with another example embodiment of the present invention, an apparatus may be provided. The apparatus may comprise at least one processor and at least one memory including computer program code, the at least one memory and the computer program code configured to, with the processor, cause the apparatus to at least store a MCG pathloss and a SCG pathloss for a MeNB MAC entity and a MCG pathloss and a SCG pathloss for a SeNB MAC entity, for each of the MeNB MAC entity and SeNB MAC entity, determine whether MCG pathloss or SCG pathloss has changed more than a corresponding threshold (e.g., dl-PathlossChange), determine whether UE has UL resources for a new transmission, and in an instance where, for at least one of the MeNB MAC entity or SeNB MAC entity, the MCG pathloss or SCG pathloss has changed (e.g., increased or decreased) more than the corresponding threshold, trigger a PHR.

In another embodiment, the at least one memory and the computer program code may be configured to, with the processor, cause the apparatus to determine whether UE has UL resources for a new transmission. The computer program code may further be configured to, with the processor, cause the apparatus to, in an instance where, when UE has UL resources for a new transmission and, for at least one of the MeNB MAC entity or SeNB MAC entity, the MCG pathloss or SCG pathloss has changed more than the corresponding threshold, trigger a PHR.

In accordance with another embodiment of the present invention, a computer program product may be provided. The computer program product may comprise at least one non-transitory computer-readable storage medium having computer-executable program code portions stored therein, the computer-executable program code portions comprising program code instructions for storing a first pathloss value and a second pathloss value for a first entity and a first pathloss value and a second pathloss value for a second entity, for each of the first entity and second entity, determining whether first pathloss value or second pathloss value has changed more than a corresponding threshold value, determining whether UE has UL resources for a new transmission, and in an instance where, for at least one of the first entity or second entity, the first pathloss value or second pathloss value has changed (e.g., increased or decreased) more than the corresponding threshold value, triggering a PHR. In another embodiment, the computer program product may further comprise at least one non-transitory computer-readable storage medium having computer-executable program code portions stored therein, the computer-executable program code portions comprising program code instructions for determining whether UE has UL resources for a new transmission, and, in an instance in which the UE has UL resources for a new transmission and, for at least one of the first entity or the second entity, the first pathloss value or second pathloss value has changed more than the corresponding threshold, triggering a PHR. In some embodiments, the UE may send one or more values (e.g., pathloss reference values) in an instance in which there is more than one cell with MCG, SCG or both.

In another embodiment, the computer program product may comprise at least one non-transitory computer-readable storage medium having computer-executable program code portions stored therein, the computer-executable program code portions comprising program code instructions for storing a MCG pathloss and a SCG pathloss for a MeNB MAC entity and a MCG pathloss and a SCG pathloss for a SeNB MAC entity, for each of the MeNB MAC entity and SeNB MAC entity, determining whether MCG pathloss or SCG pathloss has changed more than a corresponding threshold (e.g., dl-PathlossChange), determining whether UE has UL resources for a new transmission, and in an instance where, for at least one of the MeNB MAC entity or SeNB MAC entity, the MCG pathloss or SCG pathloss has changed (e.g., increased or decreased) more than the corresponding threshold, triggering a PHR.

In another embodiment, the computer-executable program code portions may further comprise program code instructions for determining whether UE has UL resources for a new transmission. The computer-executable program code portions may further comprise program code instructions for, in an instance where, when UE has UL resources for a new transmission and, for at least one of the MeNB MAC entity or SeNB MAC entity, the MCG pathloss or SCG pathloss has changed more than the corresponding threshold, triggering a PHR.

BRIEF DESCRIPTION OF THE DRAWINGS

Figure 1:
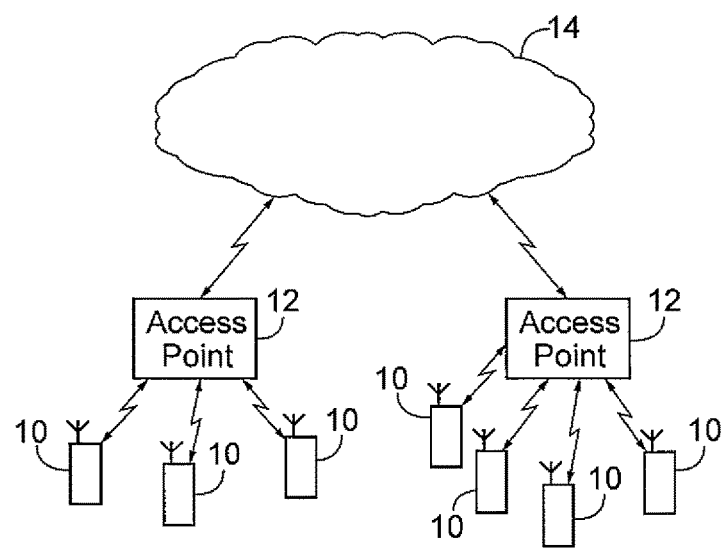
Figure 2:
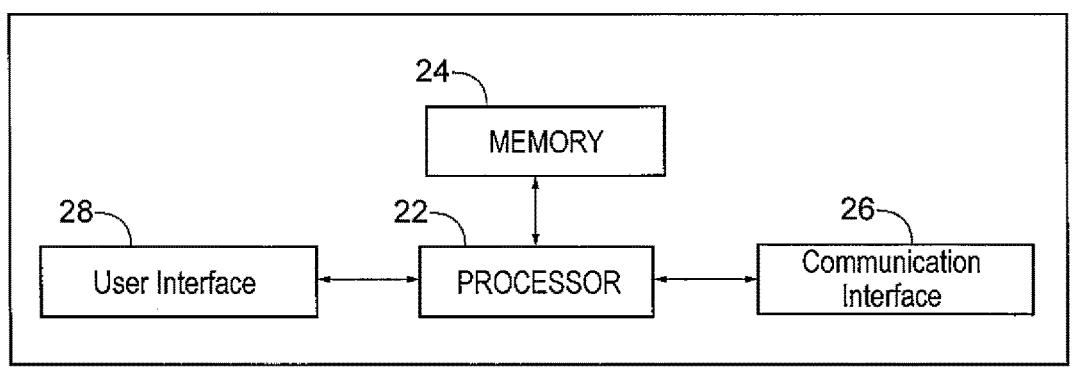
Figure 3:
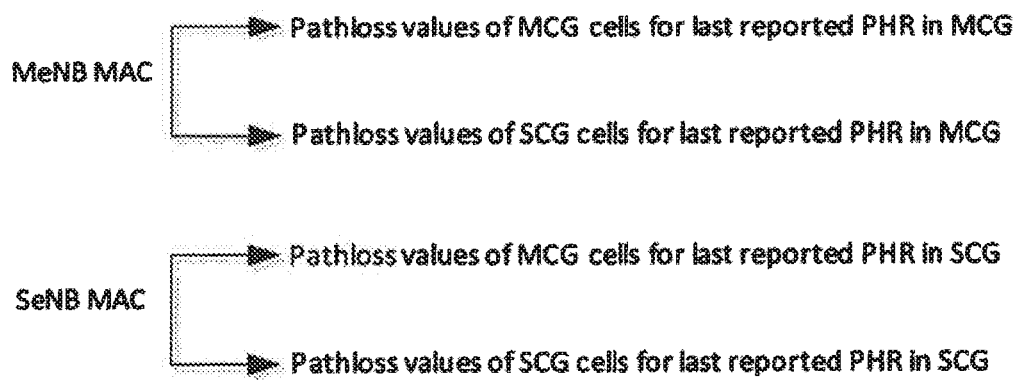
Figure 4:
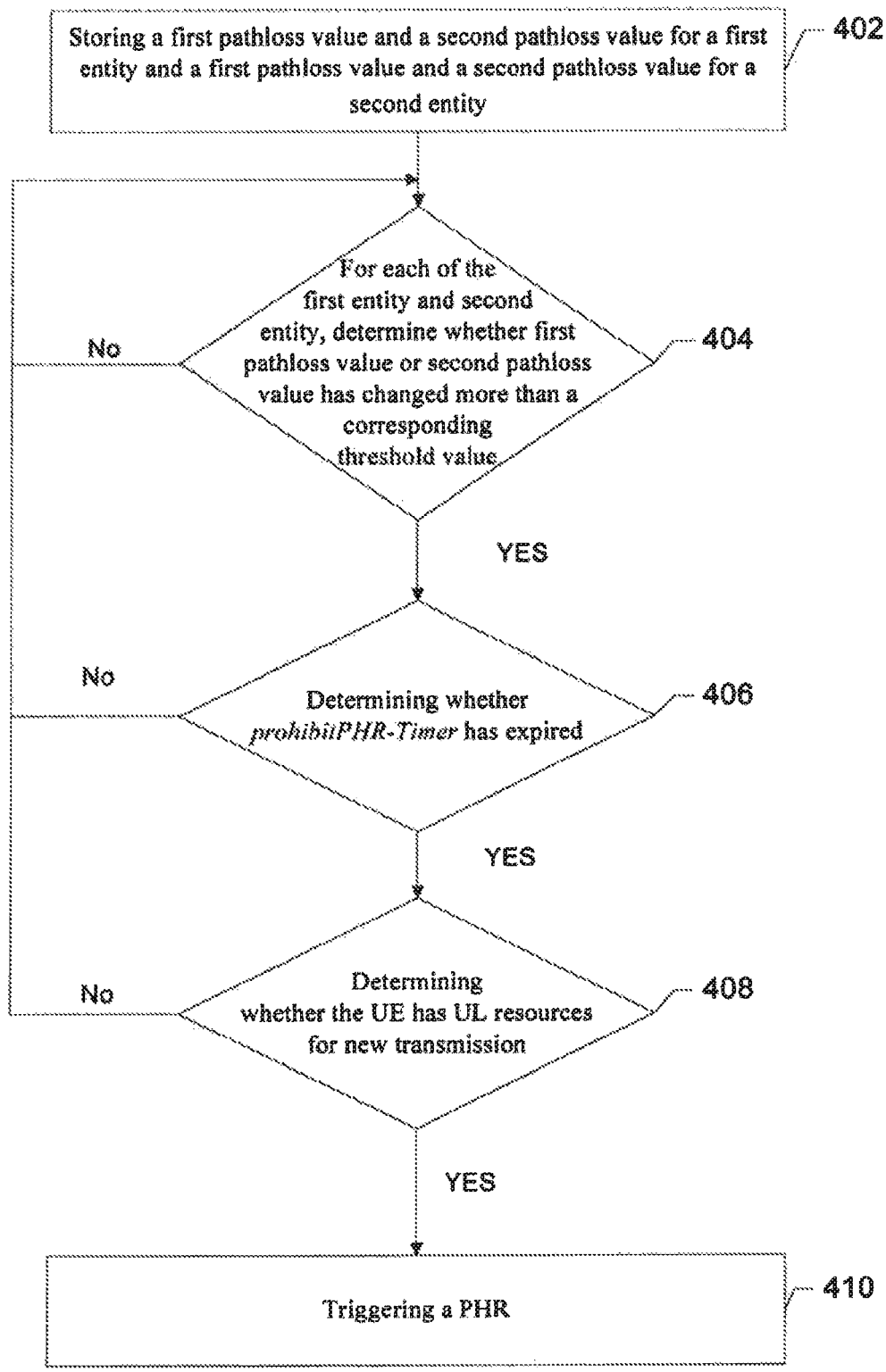
Figure 5:
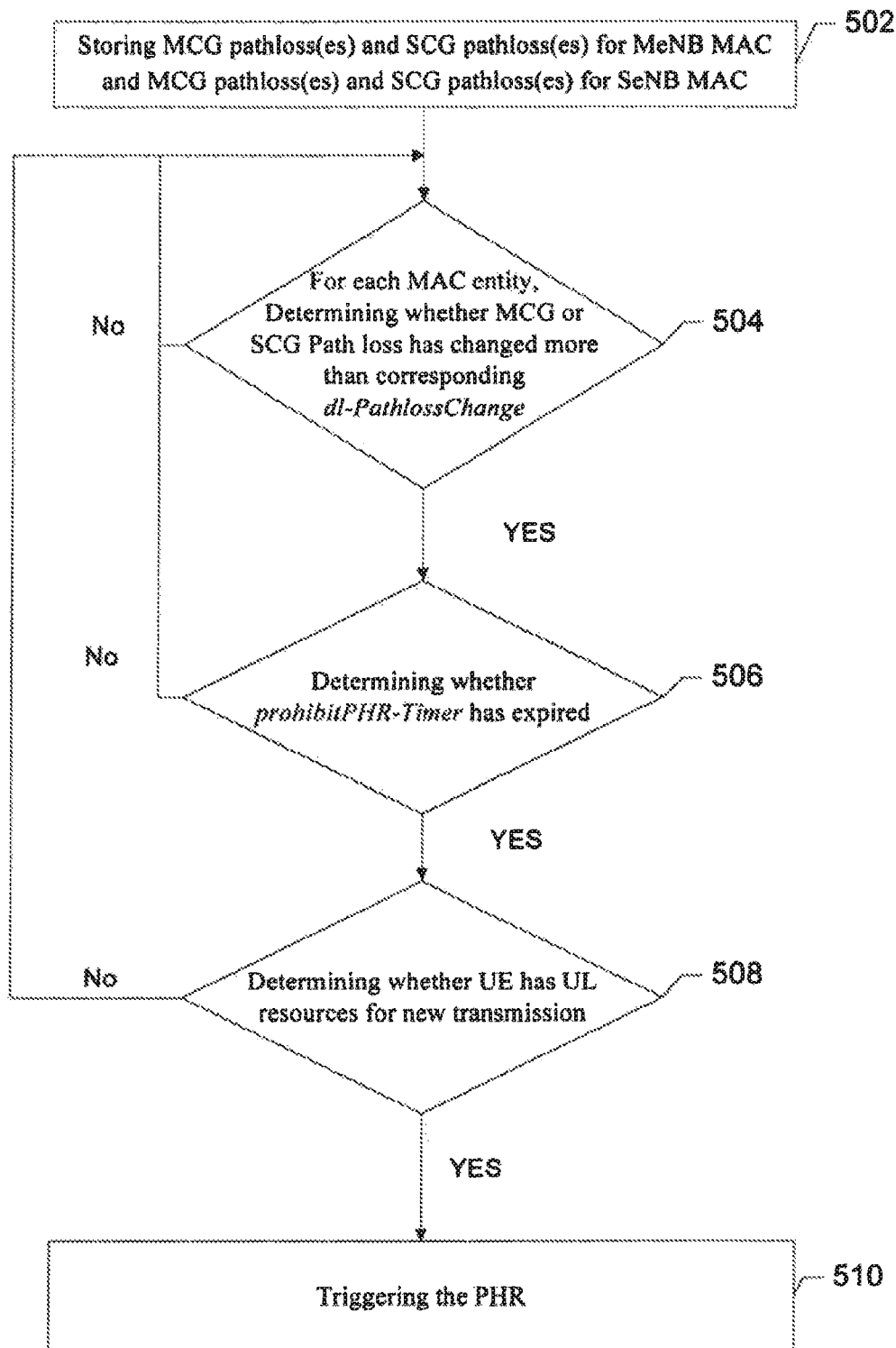
Figure 6:
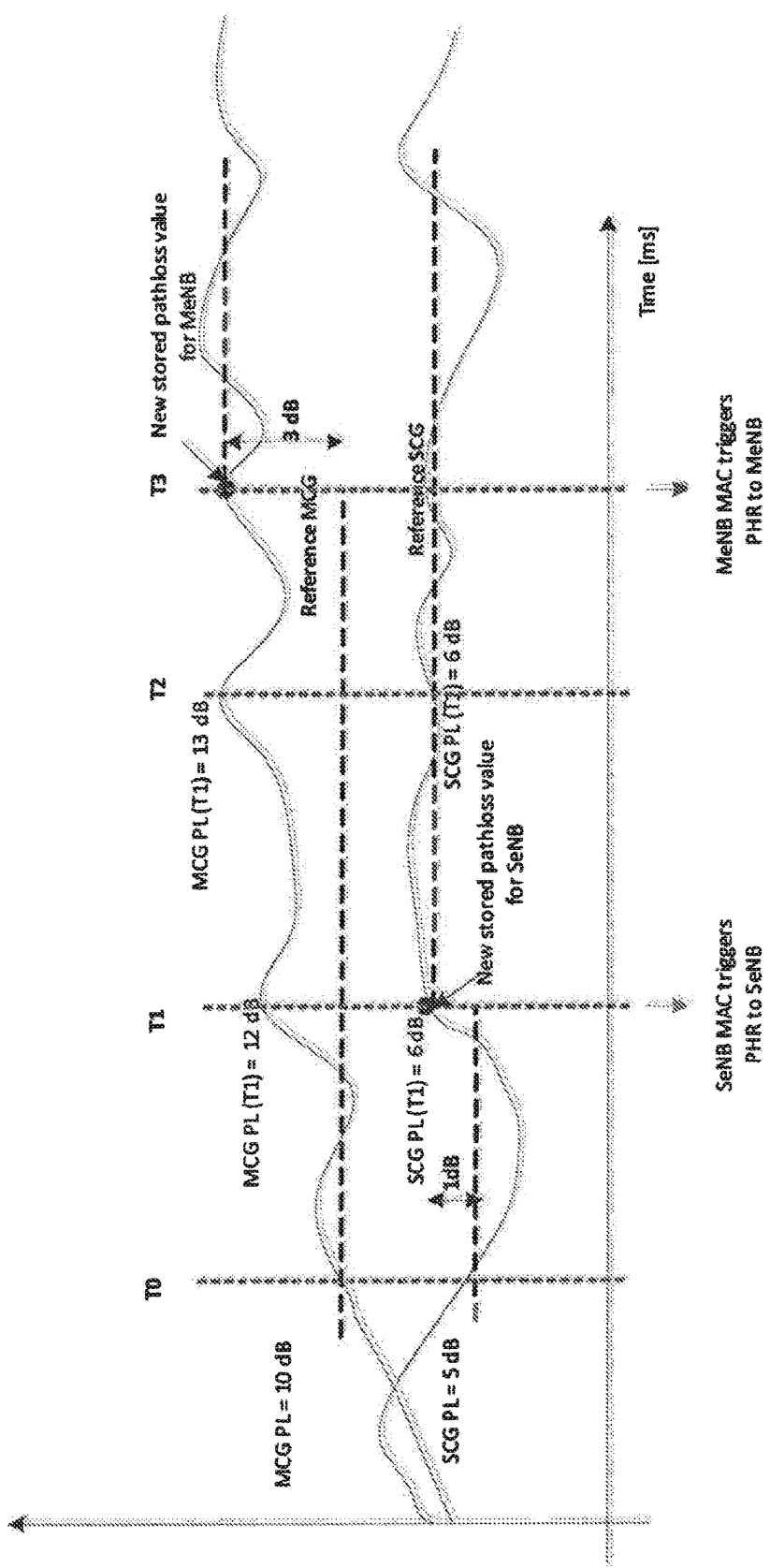

Having thus described embodiments of the invention in general terms, reference will now be made to the accompanying drawings, which are not necessarily drawn to scale, and wherein:

FIG. 1 is block diagram of a system that may be specifically configured in accordance with an example embodiment of the present invention;

FIG. 2 is a block diagram of an apparatus that may be specifically configured in accordance with an example embodiment of the present invention;

FIG. 3 is an example diagram showing the stored pathloss values for a UE, in accordance with an embodiment of the present invention;

FIG. 4 is an example flowchart illustrating a method of operating an example apparatus in accordance with an embodiment of the present invention;

FIG. 5 is an example flowchart illustrating a method of operating an example apparatus in accordance with an embodiment of the present invention; and FIG. 6 shows an exemplary diagram, in accordance with an embodiment of the present invention.

DETAILED DESCRIPTION

Some example embodiments will now be described more fully hereinafter with reference to the accompanying drawings, in which some, but not all embodiments are shown. Indeed, the example embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

As used herein, the term "circuitry" refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or application specific integrated circuit for a mobile phone or a similar integrated circuit in a server, a cellular network device, or other network device.

Referring now to FIG. 1, which illustrates an example system that supports communications between a plurality of stations 10 and one or more access points 12 (e.g., a high density system scenario where a plurality of access points may be deployed to a geographical area and may be operating on the same frequency channel), each access point may communicate with one or more stations and, in one embodiment, may communicate with a large number of stations, such as 6,000 or more stations. The access points may, in turn, communicate with a network 14. While the access points may communicate via an Long Term Evolution (LTE) or LTE-Advanced (LTE-A) network, other networks may support communications between the access points including those configured in accordance with wideband code division multiple access (W-CDMA), CDMA2000, global system for mobile communications (GSM), general packet radio service (GPRS), the IEEE 802.11 standard including, for example, the IEEE 802.11ah or 802.11ac standard or other newer amendments of the standard, wireless local access network (WLAN), Worldwide Interoperability for Microwave Access (WiMAX) protocols, universal mobile telecommunications systems (UMTS) terrestrial radio access network (UTRAN) and/or the like.

The access points 12 and the stations 10 may communicate via wireline communications, but most commonly communicate via wireless communications. For example, the access points and the stations may communicate in a sub 1 GHz band as defined by IEEE 802.11ah standard or in a 5 GHz band, which may be defined by, for example, IEEE 802.11ac standard. The access point may be embodied by any of a variety of network entities, such as an access point, a base station, a Node B, an evolved Node B (eNB), a radio network controller (RNC), a mobile device/a station (e.g., mobile telephones, smart phones, portable digital assistants (PDAs), pagers, laptop computers, tablet computers or any of numerous other hand held or portable communication devices, computation devices, content generation devices, content consumption devices, or combinations thereof), or the like. The stations may also be embodied by a variety of devices, such as sensors, meters or the like. The sensors and meters may be deployed in a variety of different applications including in utility applications to serve as a gas meter, a water meter, a power meter or the like, in environmental and/or agricultural monitoring applications, in industrial process automation applications, in healthcare and fitness applications, in building automation and control applications and/or in temperature sensing applications. Stations that are embodied by sensors or meters may be utilized in some embodiments to backhaul sensor and meter data. Alternatively, the stations may be embodied by mobile terminals or user equipment(s) (UE), such as mobile communication devices, e.g., mobile telephones, smart phones, portable digital assistants (PDAs), pagers, laptop computers, tablet computers or any of numerous other hand held or portable communication devices, computation devices, content generation devices, content consumption devices, or combinations thereof. In an embodiment in which the station is embodied by a mobile terminal, the communication between an access point and the station may serve to extend the range of wi-fi or another wireless local area network (WLAN), such as by extending the range of a hotspot, and to offload traffic that otherwise would be carried by a cellular or other network.

The access point 12 and/or the station 10 may be embodied as or otherwise include an apparatus 20 that is specifically configured to perform the functions of the respective device, as generically represented by the block diagram of FIG. 2. While the apparatus may be employed, for example, by an access point or a station, it should be noted that the components, devices or elements described below may not be mandatory and thus some may be omitted in certain embodiments. Additionally, some embodiments may include further or different components, devices or elements beyond those shown and described herein.

Regardless of the type of device that embodies the station 10, the station 10 may include or be associated with an apparatus 20 as shown in FIG. 2. In this regard, the apparatus may include or otherwise be in communication with a processor 22, a memory device 24, a communication interface 26 and a user interface 28. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

In some embodiments, the processor 22 (and/or co-processors or any other processing circuitry assisting or otherwise associated with the processor) may be in communication with the memory device 24 via a bus for passing information among components of the apparatus. The memory device may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus 20 to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by a computing device 10 configured to employ an example embodiment of the present invention. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a head mounted display) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor. In one embodiment, the processor may also include user interface circuitry configured to control at least some functions of one or more elements of the user interface 28.

Meanwhile, the communication interface 26 may be any means such as a device or circuitry embodied in either hardware or a combination of hardware and software that is configured to receive and/or transmit data between the computing device 10 and a server 12. In this regard, the communication interface 26 may include, for example, an antenna (or multiple antennas) and supporting hardware and/or software for enabling communications wirelessly. Additionally or alternatively, the communication interface may include the circuitry for interacting with the antenna(s) to cause transmission of signals via the antenna(s) or to handle receipt of signals received via the antenna(s). For example, the communications interface may be configured to communicate wirelessly with the head mounted displays 10, such as via Wi-Fi, Bluetooth or other wireless communications techniques. In some instances, the communication interface may alternatively or also support wired communication. As such, for example, the communication interface may include a communication modem and/or other hardware/software for supporting communication via cable, digital subscriber line (DSL), universal serial bus (USB) or other mechanisms. For example, the communication interface may be configured to communicate via wired communication with other components of the computing device.

The user interface 28 may be in communication with the processor 22, such as the user interface circuitry, to receive an indication of a user input and/or to provide an audible, visual, mechanical, or other output to a user. As such, the user interface may include, for example, a keyboard, a mouse, a joystick, a display, a touch screen display, a microphone, a speaker, and/or other input/output mechanisms. In some embodiments, a display may refer to display on a screen, on a wall, on glasses (e.g., near-eye-display), in the air, etc. The user interface may also be in communication with the memory 24 and/or the communication interface 26, such as via a bus.

Embodiments of the present invention may be implemented in various devices and systems, where radio signals may be used to carry data between devices such as handheld and infrastructure communications devices. Examples of the devices comprise user equipment (UE), a mobile phone, a base station (BS), a Node-B (NB), an enhanced NB (eNB), a relay station and a server, for example. For example, a small cell base station (or a wireless access point or a remote radio head, for example) may be implemented to cover a small cell, or coverage area, examples of which include a residence, a small business, a building, an office, or a small area. The small cell base station, such as for example a home base station (HNB), a home E-UTRAN NodeB base station (HeNB), a WiFi access point, and the like, may be configured to have some of the functionality found in a typical base station, such as for example an E-UTRAN NodeB (eNB) base station, but the small cell base station may have less/smaller coverage/range and lower power capabilities given its limited coverage area or class. Furthermore, small cell base station may have limited (or non-ideal) backhaul connection that may have higher latency or lower throughput than macro cell base stations. This limited backhaul connection may affect communication between small cell base station and other base stations and other network elements or nodes. A user equipment may act as an access point or a base station for other devices (multiple devices, or part of device to device communication or group communication), so that in some cases also a user equipment could be considered also a limited capability base station or small cell. For example, the small cell base station may be implemented as a femtocell wireless access point/base station having power sufficient for a cell serving wireless devices within a limited range of about tens of meters. Picocell base stations are another example of a small cell base station, but picocell base stations have somewhat greater range serving a small area on the order of about 100-200 meters. The small cell base station may be implemented as a secondary base station, for example, a secondary cell (SCell) eNB in carrier aggregation. It may also be called a secondary eNB (SeNB). Accordingly, wireless service providers view small cell base stations as a way to extend service coverage into a small cell, as a way to offload traffic to the small cell base stations, and/or as a way to provide enhanced service, such as for example higher data rates, lower latencies, energy efficiency and the like, within the small cell, when compared to the larger macro cell served by a typical base station, such as for example the eNB base station. The macro cell base station may be also implemented as a primary base station, for example, a primary cell (PCell) eNB in carrier aggregation and may also be called master eNB (MeNB). The base stations may also be configured to provide other types of air interfaces, such as various first generation (1G) communication protocols, second generation (2G or 2.5G) communication protocols, third-generation (3G) communication protocols, fourth-generation (4G) communication protocols, WiFi (or other small cell protocols), and/or any other wireless access network communication protocols. Although certain standards and technologies are described, these are merely examples as other standards and technologies may be used as well. There may be also more than one serving cell associated with MeNB and/or SeNB. These may be called MCG (Master Cell Group) and SCG (Secondary Cell Group) referring to group of serving cells associated with MeNB and SeNB respectively.

The base stations may also be configured to provide other types of air interfaces, such as various first generation (1G) communication protocols, second generation (2G or 2.5G) communication protocols, third-generation (3G) communication protocols, fourth-generation (4G) communication protocols, WiFi (or other small cell protocols), and/or any other wireless access network communication protocols. Although certain standards and technologies are described, these are merely examples as other standards and technologies may be used as well.

A method, apparatus and computer program product may be configured such that for each of at least two entities, separate pathloss references may be stored (e.g., separate pathloss references may be stored for MCG and SCG for each of MeNB MAC entity and SeNB MAC entity). MeNB MAC here means the MAC entity in the UE intended for communication with MeNB and SeNB MAC here means the MAC entity in the UE intended for communication with SeNB. In accordance with one embodiment of the present invention, a method, apparatus and computer program product may be provided configured for storing a first pathloss value and a second pathloss value for a first entity and a first pathloss value and a second pathloss value for a second entity, for each of the first entity and second entity, determining whether first pathloss value or second pathloss value has changed more than a corresponding threshold value, determining whether UE has UL resources for a new transmission, and in an instance where, for at least one of the first entity or second entity, the first pathloss value or second pathloss value has changed (e.g., increased or decreased) more than the corresponding threshold value, triggering a PHR. In another embodiment, the method may include determining whether UE has UL resources for a new transmission, and, in an instance in which the UE has UL resources for a new transmission and, for at least one of the first entity or the second entity, the first pathloss value or second pathloss value has changed more than the corresponding threshold, triggering a PHR.

Specifically, in some embodiments, since the PHR may be transmitted to one or more different access points, such as node B, eNB, or the like (e.g., MeNB and SeNB) at different times, the UE may store separate pathloss values (or separate pathloss references) related to at least two serving cells (e.g., in MCG and SCG) for the MeNB MAC entity and the SeNB MAC entity separately. In some embodiments, the separate pathloss values (or separate pathloss references) may be received, calculated, and/or stored for each MAC entity when or in response to the PHR being reported to the corresponding eNB. Each MAC entity (in UE) may then use the corresponding pathloss value when evaluating whether to or when to trigger a subsequent PHR.

FIG. 3 shows an example diagram showing the stored pathloss values in the UE. In some example embodiments, as shown in FIG. 3, for a first MAC entity (e.g., a MeNB MAC entity), both (1) pathloss values of MCG cells for the last reported PHR in the MCG and (2) pathloss values of SCG cells for the last reported PHR in the MCG, are stored. Additionally, for a second MAC entity, (e.g. a SeNB MAC entity), both (1) pathloss values of MCG cells for the last reported PHR in the SCG and (2) pathloss values of SCG cells for the last reported PHR in the SCG, are stored.

Subsequently, for each of one or more MAC entities, a Power Headroom Report (PHR) may be triggered if any of or both of the following events occur: (1) prohibitPHR-Timer for the MAC entity expires or has expired and (2) the path loss has changed more than dl-PathlossChange dB configured for the MAC entity for at least one activated Serving Cell (which is used as a pathloss reference) of either MCG or SCG since a last transmission of a PHR for the MAC entity, when the UE has UL resources for a new transmission.

FIG. 4 is an example flowchart illustrating a method of triggering a PHR in accordance with an embodiment of the present invention.

As shown in block 402 of FIG. 4, the apparatus 20 embodied by the computing device 10 may therefore be configured for storing a first pathloss value and a second pathloss value for a first entity and a first pathloss value and a second pathloss value for a second entity. The apparatus embodied by the computing device may therefore include means, such as the processor 22, the communication interface 26 or the like, for storing a first pathloss value and a second pathloss value for a first entity and a first pathloss value and a second pathloss value for a second entity. As used here, storing refers to both the actual storage of data, as well as the functions associated with causing the storage of data.

As shown in block 404 of FIG. 4, the apparatus 20 embodied by the computing device 10 may be configured to, for each of the first entity and second entity, determine whether first pathloss value or second pathloss value has changed more than a corresponding threshold value. The apparatus embodied by the computing device may therefore include means, such as the processor 22, the communication interface 26 or the like, for, for each of the first entity and second entity, determining whether first pathloss value or second pathloss value has changed more than a corresponding threshold value.

As shown in block 406 of FIG. 4, the apparatus 20 embodied by the computing device 10 may be configured to determine whether prohibitPRH-Timer has expired. The apparatus embodied by the computing device may therefore include means, such as the processor 22, the communication interface 26 or the like, for determining whether prohibitPRH-Timer has expired.

As shown in block 408 of FIG. 4, the apparatus 20 embodied by the computing device 10 may be configured to determine whether UE has UL resources for a new transmission. The apparatus embodied by the computing device may therefore include means, such as the processor 22, the communication interface 26 or the like, for determining whether UE has UL resources for a new transmission.

As shown in block 410 of FIG. 4, the apparatus 20 embodied by the computing device 10 may be configured to, in an instance where, for at least one of the first entity or second entity, the first pathloss value or second pathloss value has changed (e.g., increased or decreased) more than the corresponding threshold value, trigger a PHR. The apparatus embodied by the computing device may therefore include means, such as the processor 22, the communication interface 26 or the like, for, in an instance where, for at least one of the first entity or second entity, the first pathloss value or second pathloss value has changed (e.g., increased or decreased) more than the corresponding threshold value, triggering a PHR. In some embodiments, the apparatus embodied by the computing device may include means, such as the processor 22, the communication interface 26 or the like, for, in an instance in which the UE has UL resources for a new transmission and, for at least one of the first entity or the second entity, the first pathloss value or second pathloss value has changed more than the corresponding threshold, triggering a PHR.

Additionally or alternatively, the apparatus embodied by the computing device may include means, such as the processor 22, the communication interface 26 or the like, for, determining whether prohibitPHR-Timer has expired. And in an instance in the prohibitPHR-Timer has expired, and, for at least one of the first entity or the second entity, the first pathloss value or second pathloss value has changed more than the corresponding threshold, triggering a PHR. In some embodiments, the apparatus may be configured for determining whether a timer value has expired before triggering a PHR, thus limiting a number of PHR the UE may transmit even though the triggering conditions would otherwise be fulfilled.

FIG. 5 is an example flowchart illustrating a method of triggering a PHR in accordance with an embodiment of the present invention.

As shown in block 502 of FIG. 5, the apparatus 20 embodied by the computing device 10 may therefore be configured for storing a MCG pathloss (or pathlosses of cells belonging to MCG) and a SCG pathloss (or pathlosses of cells belonging to SCG) for a MeNB MAC entity and a MCG pathloss and a SCG pathloss for a SeNB MAC entity. The apparatus embodied by the computing device may therefore include means, such as the processor 22, the communication interface 26 or the like, for storing a MCG pathloss and a SCG pathloss for a MeNB MAC entity and a MCG pathloss and a SCG pathloss for a SeNB MAC entity.

As shown in block 504 of FIG. 5, the apparatus 20 embodied by the computing device 10 may be configured to, for each of the MeNB MAC entity and SeNB MAC entity, determine whether MCG pathloss or SCG pathloss has changed more than (or at least as much as) a corresponding threshold (e.g., dl-PathlossChange). The apparatus embodied by the computing device may therefore include means, such as the processor 22, the communication interface 26 or the like, for, for each of the MeNB MAC entity and SeNB MAC entity, determining whether MCG pathloss or SCG pathloss has changed more than (or at least as much as) a corresponding threshold.

In some example embodiments, dl-PathlossChange configured for MCG (or MeNB) is applied by both MeNB as SeNB MAC for triggering PHR due to a change in pathloss of a cell in MCG, and similarly dl-PathlossChange configured for SCG (or SeNB) is applied by both MeNB as SeNB MAC for triggering PHR due to a change in pathloss of a cell in SCG. In other example embodiments, dl-PathlossChange configured for MeNB is applied in MeNB MAC when evaluating triggering of PHR due to change of pathloss in a cell in either MCG or SCG, and similarly dl-PathlossChange configured for SeNB is applied in SeNB MAC when evaluating triggering of PHR due to change of pathloss in a cell in either MCG or SCG. In these cases the dl-PathlossChange configured in MeNB and SeNB may have different values. In some example embodiments, different dl-PathlossChange values may be configured for MCG and SCG cells for triggering PHR in MeNB MAC, and similarly for SeNB MAC. In some example embodiments, to ensure similar PHR triggering conditions in MeNB and SeNB, it may be mandated by the specification or the ensured by the network implementation that dl-PathlossChange values are same in both MeNB and SeNB. This may for example be enforced when configuring SeNB so that values differing from dl-PathlossChange in MeNB may not be or are not configured for the UE.

As shown in block 506 of FIG. 5, the apparatus 20 embodied by the computing device 10 may be configured to determine whether prohibitPRH-Timer has expired. The apparatus embodied by the computing device may therefore include means, such as the processor 22, the communication interface 26 or the like, for determining whether prohibit-PRH-Timer has expired.

As shown in block 508 of FIG. 5, the apparatus 20 embodied by the computing device 10 may be configured to determine whether UE has UL resources for a new transmission. The apparatus embodied by the computing device may therefore include means, such as the processor 22, the communication interface 26 or the like, for determining whether UE has UL resources for a new transmission.

As shown in block 510 of FIG. 5, the apparatus 20 embodied by the computing device 10 may be configured to, in an instance where, for at least one of the MeNB MAC entity or SeNB MAC entity, the pathloss to any serving cell (which is used as path loss reference) belonging to MCG or the pathloss to any serving cell (which is used as pathloss reference) belonging to SCG has changed more than the corresponding threshold, trigger a PHR. The apparatus embodied by the computing device may therefore include means, such as the processor 22, the communication interface 26 or the like, for, in an instance where, when UE has UL resources for a new transmission and, for at least one of the MeNB MAC entity or SeNB MAC entity, the MCG pathloss or SCG pathloss has changed more than the corresponding threshold, triggering a PHR. In some embodiments, the apparatus embodied by the computing device may include means, such as the processor 22, the communication interface 26 or the like, for, when UE has UL resources for a new transmission in an instance where, for at least one of the MeNB MAC entity or SeNB MAC entity, the MCG pathloss or SCG pathloss has changed more than the corresponding threshold, triggering a PHR.

In this alternative, the pathloss threshold is applied per eNB. For example, for each MAC entity, a Power Headroom Report (PHR) may be triggered if any of the following events occur: prohibitPHR-Timer for the MAC entity expires or has expired and the path loss has changed more than dl-PathlossChange dB configured for the MAC entity for at least one activated Serving Cell of either MCG or SCG which is used as a pathloss reference since the last transmission of a PHR for the MAC entity when the UE has UL resources for new transmission.

In another example embodiment, UE shall store separate set of pathloss values for each cell group, when the corresponding PHR is transmitted.

FIG. 6 shows an example embodiment of changing values for the stored MCG pathloss for MeNB MAC and SCG pathloss for SeNB MAC. It should be noted that the UE may, in other embodiments, store SCG pathloss of the MeNB MAC entity and MCG pathloss for SeNB MAC entity. However, those values are not shown here for simplicity.

As noted in FIG. 6, MeNB dl-PathlossChange=3 dB (=threshold), pathloss reference or value: MCG pathloss (PL)=10 dB, SCG PL=5 dB, SeNB dl-PathlossChange=1 dB, pathloss reference: MCG PL=10 dB, SCG PL=5 dB. At Time T0, FIG. 5 shows that MCG PL=10 dB, SCG PL=5 dB with an assumption that PHR has been sent to both MeNB and SeNB.

At Time T0, MCG PL=10 dB and SCG PL=5 dB. It is assumed that PHR has been sent to both MeNB and SeNB, or that the pathloss values stored are these for both MeNB and SeNB MAC at time T0.

Turning to Time T1, MCG PL=12 dB and SCG PL=6 dB. SeNB MAC triggers PHR to SeNB; and UE has UL allocation in SeNB (for example, due to other activity), and thus PHR may transmitted and the pathloss references for SeNB are stored according to the values at Time T1. In some embodiments, the PHR comprises power headroom values for both SCG and MCG.

At Time T2, MCG PL=13 dB and SCG PL=6 dB. In some embodiments, SeNB MAC may trigger PHR to SeNB, as MCG PL has changed 1 dB compared to reference stored at T1. MeNB MAC would trigger PHR to MeNB as MCG PL has changed 3 dB compared to reference (at T0). However, because UE has no UL allocation, PHR may not be triggered or transmitted. Note the different reference used by MeNB and SeNB MAC due to SeNB having stored new MCG and SCG values subsequent to or in conjunction with triggering the PHR described at T1.

At Time T3, MCG PL=13 dB and SCG PL=6 dB. Here, UE has/gets UL allocation to MCG (for example, due to other activity) and PHR may be triggered as the MCG PL has changed 3 dB compared to the reference (stored value) (at T0). Note that if the same pathloss reference were to be used by MeNB MAC and SeNB MAC (e.g., reference at time T1), UE would not trigger a PHR to MeNB here.

In another embodiment, UE may apply pathloss threshold configured for MeNB for cell(s) in MCG, and pathloss threshold configured for SeNB for cell(s) in SCG. When PHR is triggered based on these thresholds (timer could still trigger independently), a report is triggered to both when there is a change.

In this alternative, the pathloss threshold is applied per eNB. For example, for each MAC entity, a Power Headroom Report (PHR) may be triggered if any of the following events occur: prohibitPHR-Timer for the MAC entity expires or has expired and the path loss has changed more than dl-PathlossChange dB of the corresponding cell group for at least one activated Serving Cell of either of MCG or SCG which is used as a pathloss reference since the last transmission of a PHR for the MAC entity when the UE has UL resources for a new transmission.

As an example if dl-PathlossChange=1 dB for SeNB and dl-PathlossChange=3 dB for MeNB, UE sends PHR to both cells if pathloss of an activated serving cell in SCG changes 1 dB or more (or in some embodiments more than 1 dB), or pathloss of an activated serving cell in MCG changes 3 dB or more (or in some embodiments more than 3 dB).

In another embodiment a Scheduling Request (SR) may be triggered for PHR in certain conditions. The intention is not to trigger the SR always, but only in case there is large enough change (e.g., larger than a predefined threshold) in the PH since the previous PHR. In one embodiment, a second threshold (e.g., a higher threshold) may be configured for triggering a SR, or, additionally or alternatively, the UE may calculate and utilize a factor (e.g., twice or three times) of the configured dl-PathlossChange. Optionally, a certain time period since the previous PHR may be required as well. This embodiment may be useful for example when UE is not active in MeNB for a longer time and thus not transmitting PHR (to MeNB) even if it is triggered. Such a situation can lead to large discrepancy in understanding of power headroom (PH) in MeNB and SeNB.

FIGS. 4 and 5 illustrate example flowcharts of the example operations performed by a method, apparatus and computer program product in accordance with an embodiment of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 26 of an apparatus employing an embodiment of the present invention and executed by a processor 24 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIGS. 4 and 5, when executed, convert a computer or processing circuitry into a particular machine configured to perform an example embodiment of the present invention. Accordingly, the operations of FIGS. 4 and 5 define an algorithm for configuring a computer or processing to perform an example embodiment. In some cases, a general purpose computer may be provided with an instance of the processor which performs the algorithms of FIGS. 4 and 5 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations herein may be modified or further amplified as described below. Moreover, in some embodiments additional optional operations may also be included. It should be appreciated that each of the modifications, optional additions or amplifications below may be included with the operations above either alone or in combination with any others among the features described herein.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A method comprising:
   storing, in a user equipment configured for dual connectivity with a first entity and a second entity, a first pathloss value and a second pathloss value for the first entity and a first pathloss value and a second pathloss value for the second entity, wherein the first pathloss value is a master cell group pathloss value and the second pathloss value is a secondary cell group pathloss value, and wherein the first entity is a master eNodeB medium access control (MAC) protocol entity and the second entity is a secondary eNodeB MAC protocol entity;

determining whether first pathloss value or second pathloss value has changed more than a corresponding threshold value for each of the first entity and second entity; and triggering a power headroom report in an instance where, for at least one of the first entity or second entity, the first pathloss value or second pathloss value has changed more than the corresponding threshold value.

2. The method according to claim 1, wherein triggering a power headroom report further comprising:

determining whether a timer value has expired before triggering the power headroom report.

3. The method according to claim 1, wherein triggering a power headroom report further comprising:

determining whether the user equipment has uplink resources for a new transmission before triggering the power headroom report.

4. The method according to claim 1, wherein the power headroom report triggered by the secondary eNodeB medium access control protocol entity is transmitted in the master eNodeB medium access control protocol entity when uplink resources are allocated for transmission in the master eNodeB medium access control protocol entity.

5. The method according to claim 1, wherein the power headroom report triggered by the master eNodeB medium access control protocol entity is transmitted in the secondary eNodeB medium access control protocol entity when uplink resources are allocated for transmission in the secondary eNodeB medium access control protocol entity.

6. The method according to claim 1, further comprising:

storing one or more additional master cell group or secondary cell group pathloss values for one or both of the master eNodeB medium access control protocol entity and the secondary eNodeB medium access control protocol entity in an instance in which there is more than one cell with master cell group, secondary cell group or both.

7. An apparatus comprising at least one processor and at least one memory including computer program code, the at least one memory and the computer program code configured to, with the processor, cause the apparatus to at least:

store, in a user equipment configured for dual connectivity with a first entity and a second entity, a first pathloss value and a second pathloss value for the first entity and a first pathloss value and a second pathloss value for the second entity, wherein the first pathloss value is a master cell group pathloss value and the second pathloss value is a secondary cell group pathloss value, and wherein the first entity is a master eNodeB medium access control (MAC) protocol entity and the second entity is a secondary eNodeB MAC protocol entity;

determine whether first pathloss value or second pathloss value has changed more than a corresponding threshold value for each of the first entity and second entity; and trigger a power headroom report in an instance where, for at least one of the first entity or second entity, the first pathloss value or second pathloss value has changed more than the corresponding threshold value.

8. The apparatus according to claim 7, wherein the at least one memory and computer program instructions configured to trigger a power headroom report are further configured to:

determine whether a timer value has expired before triggering the power headroom report.

9. The apparatus according to claim 7, wherein the at least one memory and computer program instructions configured to trigger a power headroom report are further configured to:

determine whether the user equipment has uplink resources for a new transmission before triggering the power headroom report.

10. The apparatus according to claim 7, wherein the power headroom report triggered by the secondary eNodeB medium access control protocol entity is transmitted in the master eNodeB medium access control protocol entity when uplink resources are allocated for transmission in the master eNodeB medium access control protocol entity.

11. The apparatus according to claim 7, wherein the power headroom report triggered by the master eNodeB medium access control protocol entity is transmitted in the secondary eNodeB medium access control protocol entity when uplink resources are allocated for transmission in the secondary eNodeB medium access control protocol entity.

12. The apparatus according to claim 7, wherein the at least one memory and computer program instructions are further configured to, with the at least one processor, cause the apparatus to at least:

store one or more additional master cell group or secondary cell group pathloss values for one or both of the master eNodeB medium access control protocol entity and the secondary eNodeB medium access control protocol entity in an instance in which there is more than one cell with master cell group, secondary cell group or both.

13. A computer program product comprising at least one non-transitory computer-readable storage medium having computer-executable program code portions stored therein, the computer-executable program code portions comprising program code instructions for:

storing a first pathloss value and a second pathloss value for a first entity and a first pathloss value and a second pathloss value for a second entity, wherein the first pathloss value is a master cell group pathloss value and the second pathloss value is a secondary cell group pathloss value, and wherein the first entity is a master eNodeB medium access control (MAC) protocol entity and the second entity is a secondary eNodeB MAC protocol entity;

determining whether first pathloss value or second pathloss value has changed more than a corresponding threshold value for each of the first entity and second entity; and triggering a power headroom report in an instance where, for at least one of the first entity or second entity, the first pathloss value or second pathloss value has changed more than the corresponding threshold value.

14. The computer program according to claim 13, wherein the program code configured to trigger a power headroom report further comprising:

determining whether a timer value has expired before triggering the power headroom report.

15. The computer program according to claim 13, wherein the program code configured to trigger a power headroom report further comprising:

determining whether the user equipment has uplink resources for a new transmission before triggering the power headroom report.

16. The computer program according to claim 13, wherein the power headroom report triggered by the secondary eNodeB medium access control protocol entity is transmitted in the master eNodeB medium access control protocol entity when uplink resources are allocated for transmission in the master eNodeB medium access control protocol entity.

17. The computer program according to claim 13, wherein the power headroom report triggered by the master eNodeB medium access control protocol entity is transmitted in the secondary eNodeB medium access control protocol entity when uplink resources are allocated for transmission in the secondary eNodeB medium access control protocol entity.

\* \* \* \* \*